United States Patent [19]

Williams

[11] Patent Number: 5,048,236

[45] Date of Patent: Sep. 17, 1991

[54] SAW BLADE TOOTH GRINDER FOR SAWS

[75] Inventor: Christopher C. Williams, Port Moody, Canada

[73] Assignee: Williams & White Machine Shop, Burnaby, Canada

[21] Appl. No.: 443,423

[22] Filed: Nov. 29, 1989

[51] Int. Cl.⁵ .............................................. B24B 3/36
[52] U.S. Cl. ............................ 51/77 BS; 51/92 BS; 51/165.77; 76/33; 76/37; 76/43; 76/77
[58] Field of Search .................... 76/37, 40, 41, 42, 43, 76/75, 77, 35, 33, 31; 51/74 BS, 77 R, 77 BS, 91 BS, 92 BS, 34 E, 35, 38, 44, 45, 64, 215 R, 215 CP, 165.71, 165.77, 165.8

[56] References Cited

U.S. PATENT DOCUMENTS

| | | | |
|---|---|---|---|
| 2,651,219 | 9/1953 | Tower et al. | 76/37 |
| 3,114,274 | 12/1963 | Holst | 76/33 X |
| 3,204,491 | 9/1965 | Sagarian | 76/43 |
| 3,313,185 | 4/1967 | Drake et al. | 76/43 |
| 4,136,585 | 1/1979 | Lenard | 76/40 |
| 4,426,894 | 1/1984 | Nicolodi | 76/75 |
| 4,449,427 | 5/1984 | Beck et al. | 76/37 X |
| 4,754,667 | 7/1988 | Widmann et al. | 76/37 |
| 4,846,023 | 7/1989 | Emter | 76/41 |

Primary Examiner—D. S. Meislin
Attorney, Agent, or Firm—Townsend and Townsend

[57] ABSTRACT

A device for grinding saw blades, both hand saws and circular saws so that a predetermined tooth profile is obtained, utilizes a grinding head that moves in one plane and moves the saw in a second plane. The device comprises a saw blade mount, an indexing system for indexing a saw tooth to move in a first plane, a grinding head to grind a saw tooth, a grinding head travel arrangement to move the grinding head in a second plane, the second plane being at an angle of about 35° from the perpendicular of the first plane, and a control system for controlling movement of the saw blade in the first plane and the grinding head in the second plane to ensure a predetermined saw tooth profile is ground.

7 Claims, 3 Drawing Sheets

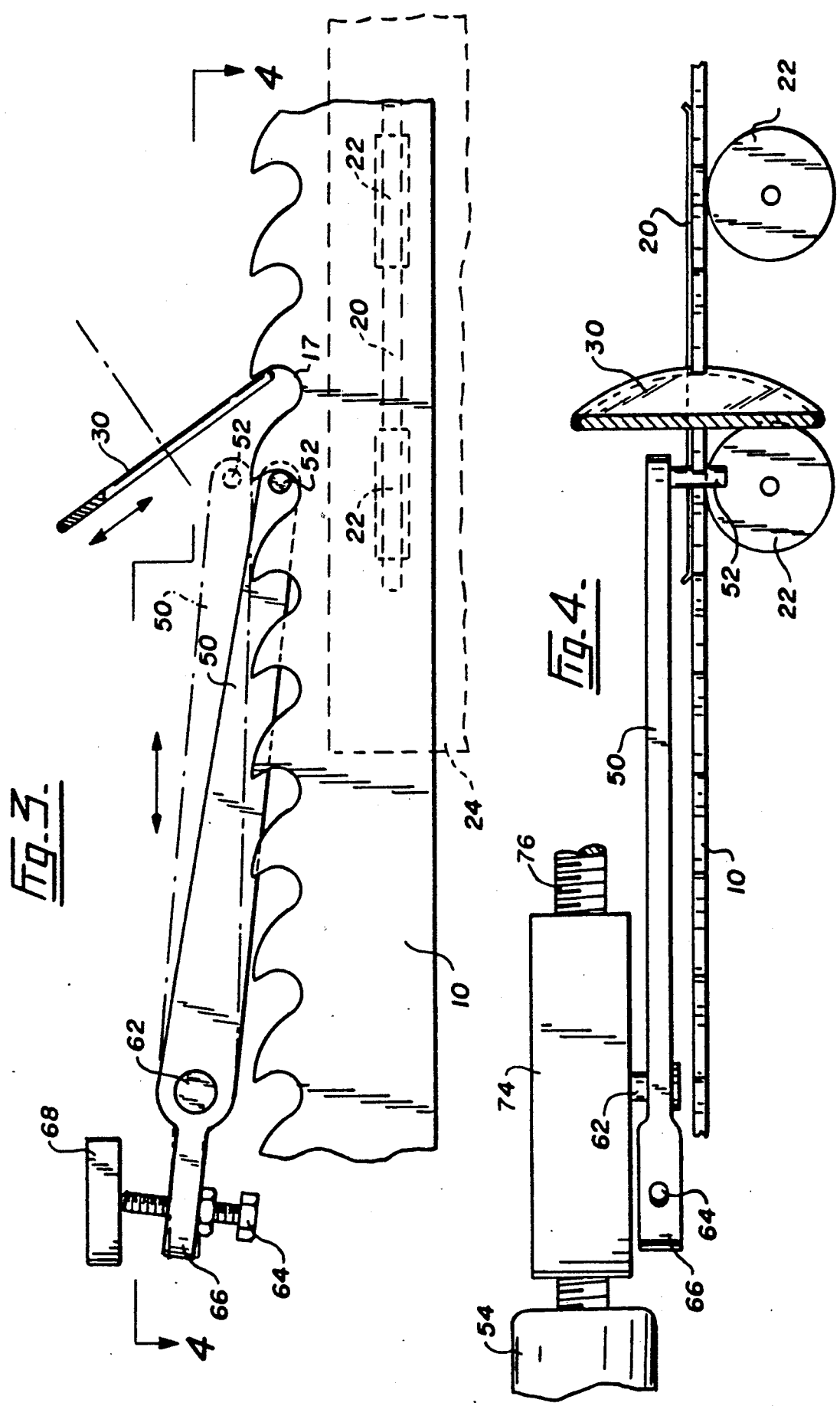

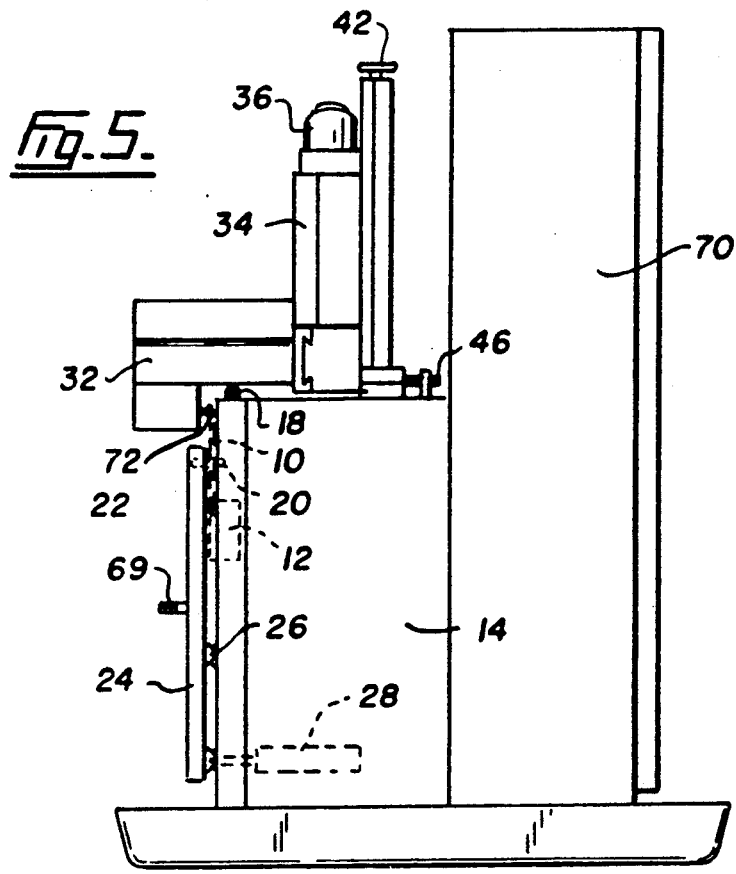
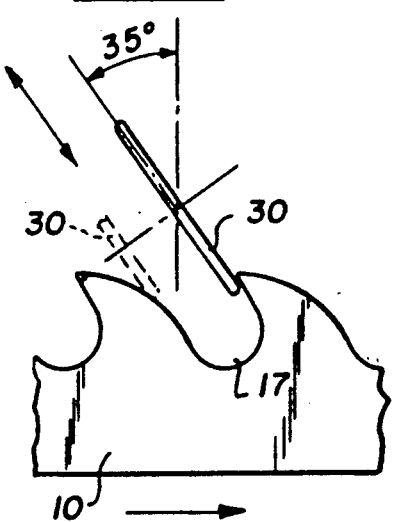
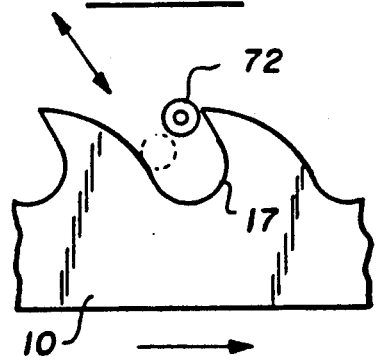

SAW BLADE TOOTH GRINDER FOR SAWS

BACKGROUND AND SUMMARY OF THE INVENTION

The present invention relates to a device for grinding saw blade teeth on band or circular saws and more specifically to a saw blade tooth grinder wherein a predetermined tooth profile may be ground.

Band saw blades and circular saw blades used in saw mills and the like are sharpened from time to time and this is done by a grinder. Machines are available wherein a saw blade is held for sharpening each tooth. A grinder is used for this purpose and there are presently available devices wherein the grinder follows a profile using a mechanical cam arrangement to ensure that each tooth is cut to a predetermined profile. The cam arrangement requires considerable set up time for different saw blades which is time consuming and requires constant supervision.

It is an aim of the present invention to provide an apparatus for grinding saw teeth on a saw blade wherein the grinding of each individual saw tooth is accomplished by means of servo motors that combine to push the saw blade in the plane of the saw and at the same time move a rotating grinder down in another plane to grind each saw tooth in accordance with a predetermined profile. The profile is determined by utilizing a computer program or the like and thus it is simply a matter of reprogramming a computer rather than disassembling and reassembling a complicated mechanical machine. Furthermore, once the saw blade has been mounted on the apparatus and the guiding commenced, the machine grinds each tooth unattended, and then stops after the last tooth is ground.

The present invention provides an apparatus for grinding saw teeth on a saw blade comprising saw blade mounting means, saw blade indexing means for indexing a saw tooth to move in a first plane on the mounting means, grinding head having means to grind a saw tooth, grinding head travel means to move the grinding head in a second plane, the second plane being at an angle of about 35° from the perpendicular of the first plane, and control means for controlling movement of the saw blade in the first plane and the grinding head in the second plane to ensure a predetermined saw tooth profile is ground.

BRIEF DESCRIPTION OF THE DRAWINGS

In drawings which illustrate embodiments of the invention,

FIG. 3 is a detailed front view of the saw blade indexing means and grinding wheel of FIG. 1.

FIG. 4 is a detailed top view taken at line 4—4 of FIG. 3.

FIG. 5 is a side view showing another embodiment of a saw tooth grinder according to the present application.

FIG. 6 is a detailed front view of a grinding wheel grinding across a saw tooth.

FIG. 7 is a detailed plan view of a saw blade showing the grinding marks across the face of the saw blade.

FIG. 8 is a detailed front view of a small cylindrical slated grinding wheel grinding in line with a saw tooth.

FIG. 9 is a detailed plan view of a saw blade showing the grinding marks in line with the face of the saw blade.

BRIEF DESCRIPTION OF THE PREFERRED EMBODIMENTS

Figure 1:
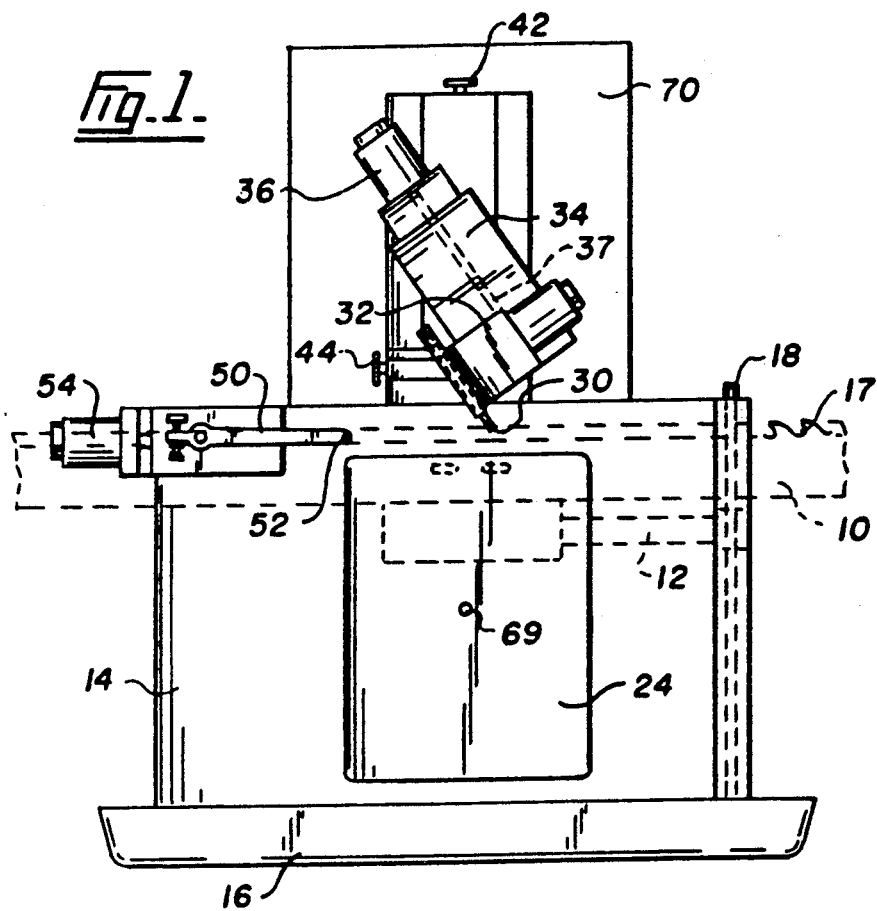
FIG. 1 is a front elevational view showing one embodiment of a saw tooth grinder according to the present invention.
Figure 2:
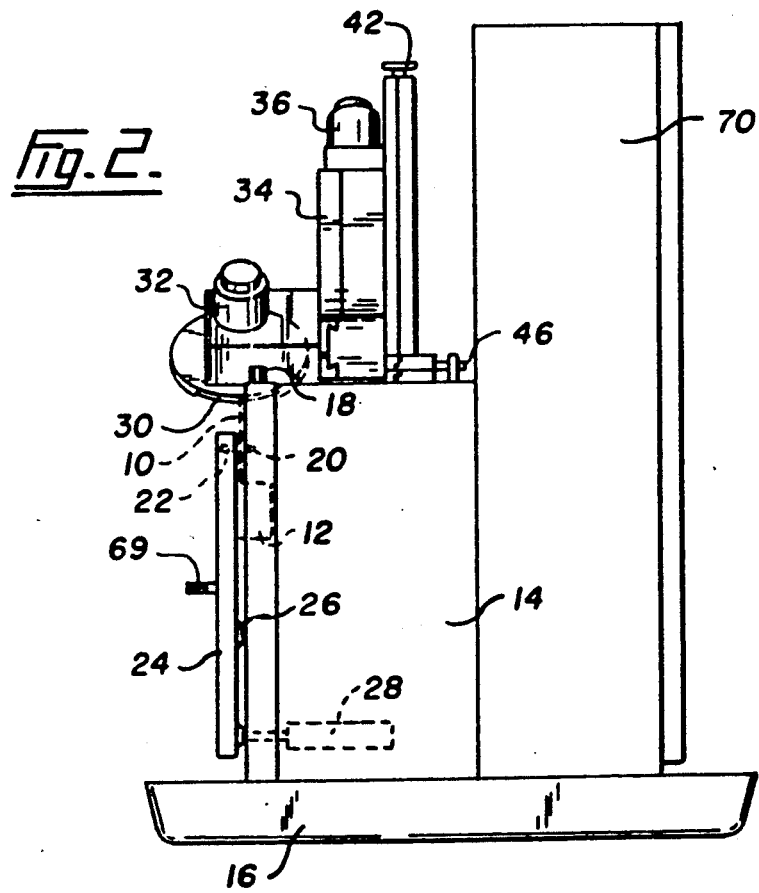
FIG. 2 is a side view of the apparatus shown in FIG. 1.

One embodiment of the grinding machine is illustrated in FIGS. 1 and 2 wherein a band saw blade 10 rests on a support 12 at one side of a frame 14 sitting in a tray resting on base 16. The saw teeth 17 are at the top held for grinding. The saw support 12 for the saw blade 10 can be adjusted up and down by a manually operated slide to take into account different thicknesses of band saw blades. The slide has a hexagonal head 18 for attaching a handle or wrench.

The saw blade 10 is held in position by a carbide face plate 20 in the frame 14 and two guide rollers 22 in a pivoted mounting panel 24 with a pivot point 26 at the centre joined to the frame 14 and an air cylinder 28 beneath the pivot point 26 to push the top of the panel inwards so that the blade 10 is held between the guide rollers 22.

A grinding wheel 30 driven by a constant speed motor 32 is mounted with its axis at an angle of substantially 35° to the horizontal or to the plane of the saw blade 10. The grinding wheel motor 32 is mounted on a grinding head 34 that moves up and down a straight track in a plane which is perpendicular to the axis of the grinding wheel 30 and motor 32. A servo motor 36 rotates screw thread 37 to move the grinding head 34 up and down the track to position the grinding wheel 30 relative to the saw blade 10. The grinding head 34 and track are mounted on a set of manually adjusted slides supported on the frame 14. A vertical slide is adjusted by a wheel 42 for raising and lowering the grinding head 34, a longitudinal slide is adjusted by wheel 44 for moving the grinding head 34 in line with the saw blade 10 and hexagonal head 46 to move the grinding head 34 backwards and forwards from the saw blade 10, to locate the grinding wheel in the centre of the saw blade 10, and accommodate different thickness of saw blade 10. The three slides permit the grinding wheel 30 to be located in the required relationship to the saw blade 10. The vertical slide and the longitudinal slide move the grinding wheel 30 so that a cut may be taken on the saw blade 10.

The saw blade itself is moved by an indexing mechanism including an arm 50 with a saw tooth engaging pin 52 which moves backwards and forwards on a screw thread powered by a servo motor 54.

FIGS. 3 and 4 illustrate details of the indexing mechanism wherein the arm 50 having a tooth engaging pin 52 at one end engages in one tooth 17 of the saw blade. The arm 50 has a pivot 62 and is weighted so that the pin 52 is always pressing downwards. The pivot 62 is connected to a sliding member 74 which is moved backwards and forwards by screw thread 76. An adjustable set screw 64 through a tab 66 extending from the back of the arm 50 rests against a flange 68 which forms part of the indexing mechanism moved by the servo motor 54. The control system for the unit is contained in the control cabinet 70 behind the frame 14.

In operation the movement of the blade indexing means and the grinding wheel 30 are controlled by the control system which is a computer programmed to grind a predetermined saw tooth profile. The servo motors 36 and 54 move the grinding wheel 30 downwards and then back up again along the angular plane at the same time as the tooth engaging pin 52 pushes the saw blade 10 forward in the horizontal plane so that a tooth 17 one ahead of that engaged by the pin 52 is ground. This can be seen in FIG. 3. Once the indexing system has pushed the tooth 17 to its furthest forward position then it moves back and the pin 52 rides up over the tooth 17 to drop into the next space behind the tooth 17 and commences the grinding sequence for the next tooth.

Whereas a band saw blade 10 is illustrated in the drawings, a circular saw blade can also be ground on the machine. The circular saw blade is mounted axially at axis 69, clamped in substantially the same manner as the band saw blade, and indexed by the indexing mechanism to rotate tooth by tooth.

The computer is also programmed to count the number of teeth ground so after the total number of teeth on the band saw blade or the circular saw blade have been ground, then the machine stops itself.

Variable teeth parameters may be ground by simply feeding a new program into the computer which affects the movement of the two servo motors driving the grinding wheel 30 and the pusher pin 52. The two servo motors 36 and 54 preferably drive screw threads 35 and 76 with ball bearings for ease and accuracy of movement. With the second plane being at an angle of about 35° from the perpendicular of the first plane the combination of movement of the saw blade 10 and the grinding head 34 permits cutting angles from about 25° up to 35° from the perpendicular of the first plane, provided the grinding wheel 30 does not foul the back of the adjacent saw tooth 17.

FIG. 5 illustrates another embodiment wherein the grinding wheel 30 shown in FIG. 1, which has a reasonably large diameter and grinds across the face of a tooth 17, is replaced by a small cylindrical shaped grinding wheel 72 that rotates within the saw tooth 17 in line with the blade 10. The cylindrical grinder 72 moves in the angular plane so that it grinds the tooth profile 17 in the same way as the grinding wheel 30 shown in FIG. 1. FIGS. 6 and 7 illustrate the grinding wheel having an abrasive material on the periphery of the wheel 30. The abrasive material may be diamond grit or a cubic boron nitride sold under the trade mark BORAZON. As seen in FIG. 7 the grinding lines occur across the face of the saw tooth 17. FIG. 8 shows the cylindrical grinder 72 and as can be seen in FIG. 9 the grinding lines are in line with the saw blade 10. It has been found that less stress is built up within the saw blade 10 if the grind lines are in line with the saw blade rather than across the face.

In one embodiment the grinding wheel 30 has an eight inch diameter, one quarter inch wide, with a sixty mesh diamond abrasive bonded in a nickel matrix. Full flood cooling is provided for grinding and the frame 14 stands in a tray for collection of the coolant.

In one embodiment the servo motor 54 is programmed to move the saw tooth forward in one and a half seconds and a half second return to index the next tooth. The accuracy with utilizing computer control is to within one thousandth of an inch or less. For the case of the cylindrical grinder 72 a half inch diameter cylindrical grinder 72 has proven satisfactory. Safety controls are provided to turn off the machine due to overloading. Covers are provided over the grinding wheel 30 or cylindrical grinder 72 for safety.

Various changes may be made to the embodiments shown herein without departing from the scope of the present invention which is limited only by the following claims.

The embodiments of the present invention in which an exclusive property or privilege is claimed are defined as follows:

1. An apparatus for grinding saw teeth on a blade, comprising:
   saw blade mounting means,
   saw blade indexing means for indexing a saw tooth to move in a first plane on the mounting means, the saw blade indexing means operated by a first servo motor,
   a grinding head having means to grind a saw tooth,
   grinding head travel means to move the grinding head in a second plane, the second plane being at an angle of about 35° from the perpendicular of the first plane, the grinding head travel means operated by a second servo motor,
   control means, wherein said servo motors are simultaneously actuated by a programmed computer, for controlling movement of the saw blade in the first plane, and at the same time controlling movement of the grinding head in the second plane such that the blade and the grinding head are moved simultaneously during grinding of a curved portion of the saw tooth to ensure a predetermined curved saw tooth profile is ground.

2. The apparatus according to claim 1 wherein the saw blade indexing means indexes each saw tooth to complete grinding a saw blade.

3. The apparatus according to claim 1 wherein the grinding means comprises a rotating disk, with abrasive on the periphery, to grind across the face of the saw tooth.

4. The apparatus according to claim 1 wherein the grinding means comprises a small cylindrical shaped grinder wheel to fit within the profile of the saw tooth and grind in line with the face of the saw tooth.

5. The apparatus according to claim 1 wherein the mounting means comprises a saw support having an adjustment means for accommodating different sizes of saw blades, and clamp means to clamp the saw blade but permit movement from the indexing means.

6. The apparatus according to claim 1 wherein the indexing means comprises an arm with saw tooth engaging means, wherein the arm pivots to lift the saw tooth engaging means when moving away from the grinding head to engage the adjacent saw tooth; and means to move the arm away from and towards the grinding head in the first plane.

7. An apparatus for grinding saw teeth on a saw blade, comprising:
   saw blade mounting means,
   saw blade indexing means for indexing a saw tooth to move in a first plane on the mounting means, the saw blade indexing means operated by a first servo motor,
   a grinding head having means to grind a saw tooth,
   grinding head travel means to move the grinding head in a second plane, the second plane being at an angle of about 35° from the perpendicular of the first plane, the grinding head travel means operated by a second servo motor,
   control means, wherein said servo motors are simultaneously actuated by a programmed computer, for controlling movement of the saw blade in the first plane and at the same time controlling movement of the grinding head in the second plane such that the blade and the grinding head are moved simultaneously during grinding of a curved portion of the saw tooth to ensure a predetermined saw tooth profile is ground; wherein the first servo motor drives a first screw thread connected to the indexing means and the second servo motor drives a second screw thread connected to the grinding head.

* * * * *